United States Patent [19]

Hansen

[11] 3,743,045

[45] July 3, 1973

[54] ENGINE HOOD LATCH
[75] Inventor: Kenneth N. Hansen, Waukesha, Wis.
[73] Assignee: Allis-Chalmers Corporation, Milwaukee, Wis.
[22] Filed: July 29, 1971
[21] Appl. No.: 167,096

[52] U.S. Cl.......... 180/69 R, 292/228, 292/DIG. 14
[51] Int. Cl............................................. B62d 25/12
[58] Field of Search.............. 180/69 R, 69 C, 54 A; 292/228, DIG. 14; 296/28 C

[56] References Cited
UNITED STATES PATENTS

| 2,059,302 | 11/1936 | Barber et al. | 292/228 |
| 3,307,336 | 3/1967 | Dewsberry | 180/69 R X |
| 2,875,840 | 3/1959 | Klemm | 180/54 A |
| 1,981,093 | 11/1934 | Conarroe | 180/69 R X |
| 3,583,513 | 6/1971 | Macadam et al. | 180/69 R |
| 2,699,223 | 1/1955 | Brumbaugh | 296/28 C X |
| 2,845,133 | 7/1958 | Norrie et al. | 296/28 C X |
| 2,582,839 | 1/1952 | Lippard et al. | 180/69 R X |

Primary Examiner—Kenneth H. Betts
Assistant Examiner—David M. Mitchell
Attorney—Arthur L. Nelson et al.

[57] ABSTRACT

A self-sealing latch for a side panel of an engine hood enclosing an engine compartment.

10 Claims, 5 Drawing Figures

PATENTED JUL 3 1973

Inventor
Kenneth R. Hansen
by Arthur Nelson
Attorney

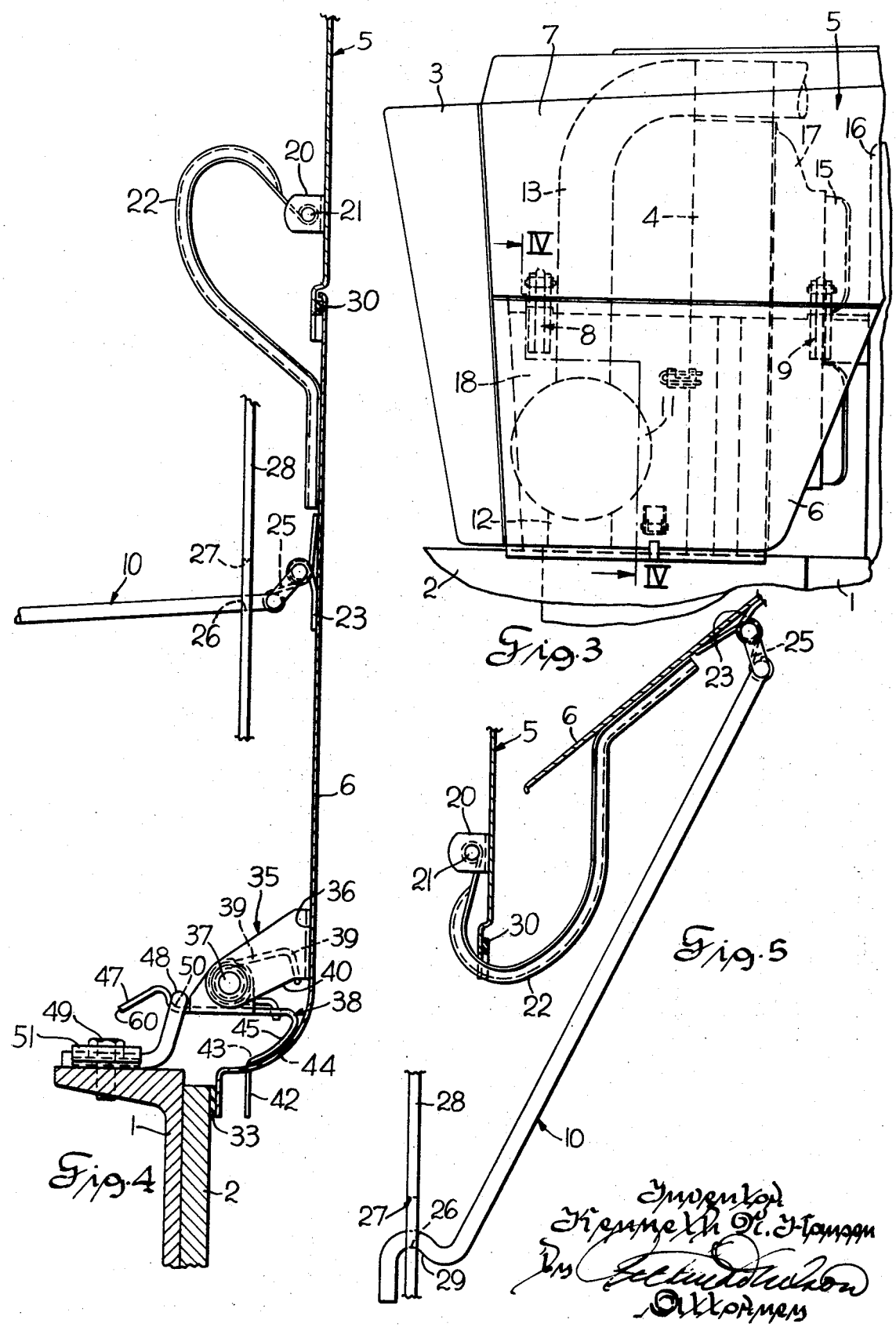

ENGINE HOOD LATCH

This invention relates to a latch and more particularly to a self-sealing, self-latching latch for latching the side panel of an engine hood.

The conventional internal combustion engine is mounted on a chassis together with the radiator which form a liquid cooling system for cooling the engine. Conventional construction on most vehicles also includes a grill which is positioned immediately in front of the radiator which serves partially as a means for separating large particles of foreign material from the air as the air passes through the grill and also serves as a decorative piece forming a part of the design of the vehicle on which the engine may be mounted. Since the grill is spaced forwardly of the radiator, it forms a compartment intermediate of the radiator and grill which may be used for accessory equipment such as an air cleaner for the engine. The air cleaner, however, requires servicing from time to time, and accordingly, access must be available to the compartment formed between the grill and the radiator.

Conventional construction may provide for means of removing the grill or removing the side panel which often is inconvenient and can be time consuming. This is particularly true where the grill assembly is large and requires holding the assembly while aligning a number of widely spaced attaching points in order to reassemble the grill on the vehicle. While it is desirable to have access to the compartment, it is also desirable that the access door should include sealing means to prevent airborne trash from being drawn into the compartment and through the radiator by action of the radiator fan when the vehicle is in operation.

The present invention is concerned with improving the means for access to this compartment, and also a means for providing latching of the side panel which forms part of the enclosure around this compartment. It is understood that the use of such a latch is not limited to an enclosure on this compartment, but the latch may adapt itself well to a panel around the engine compartment as well. The latch permits the side panel to swing outwardly from the vehicle and unseal the side panel from the hood supporting assembly. When the side panel is latched in position, the compartments intermediate the radiator and grill are sealed against entry of chaff and such airborne materials which have a tendency to clog the air passages in the radiator and prevent the free flow of air through the radiator to the cooling system. The handle is connected to the latch and serves as an unlatching means which can be readily grasped to exert an outward pull on the side panel to release the latch and thereby freeing the panel for pivotal movement. Secondly, the handle serves as a means to lift and pivot the panel upwardly about its hinged connection on the vehicle hood.

It is an object of this invention to provide a latch for latching a side panel on the engine hood of the vehicle.

It is another object of this invention to provide a self-sealing, self-latching arrangement on a side panel of an engine hood.

It is a further object of this invention to provide a self-sealing, self-latching latch member on the side panel of an engine hood to readily provide access to a sealed compartment intermediate the grill and the radiator for servicing of accessory equipment mounted therein.

The objects of this invention are accomplished by providing side panels pivotally connected to the side portions of an engine hood. The grill, the radiator, and the cowl support the engine hood. A compartment is formed between the grill and the radiator permitting the positioning of an air filter and such accessory equipment associated with operation of the engine. The side panels pivotally mounted on the engine hood carry a latch which engages a pawl on the chassis of the vehicle. The access opening covered by the side panel is constructed with a sealing surface which contacts the side panel as the side panel is dropped downwardly toward the side of the vehicle where it is latched in position by a self-latching latch means. The latch firmly draws the panel against the seal forming a sealed access opening when in the latched position.

The grill assembly is provided with small perforations to limit the size of airborne material which passes through the grill and which can pass by the air filter through the radiator. The latch means is positioned to extend through an opening in the side panel to permit a handle to extend therefrom for unlatching the latch means and the latch member swings through the opening to seal the opening when the latch is engaged with the pawl on the chassis, to thereby provide a self-sealing latching arrangement on the side panel.

Referring to the drawings, the preferred embodiments of the invntion are illustrated.

FIG. 3 is a side view of the front end of the vehicle showing the side panel in latched position.

FIG. 4 is an enlarged view taken on line IV—IV of FIG. 3.

FIG. 5 is an enlarged view similar to FIG. 4 showing the side panel in the open position with the side panel supported on a strut engaging a portion of the radiator supporting structure.

Figure 1:
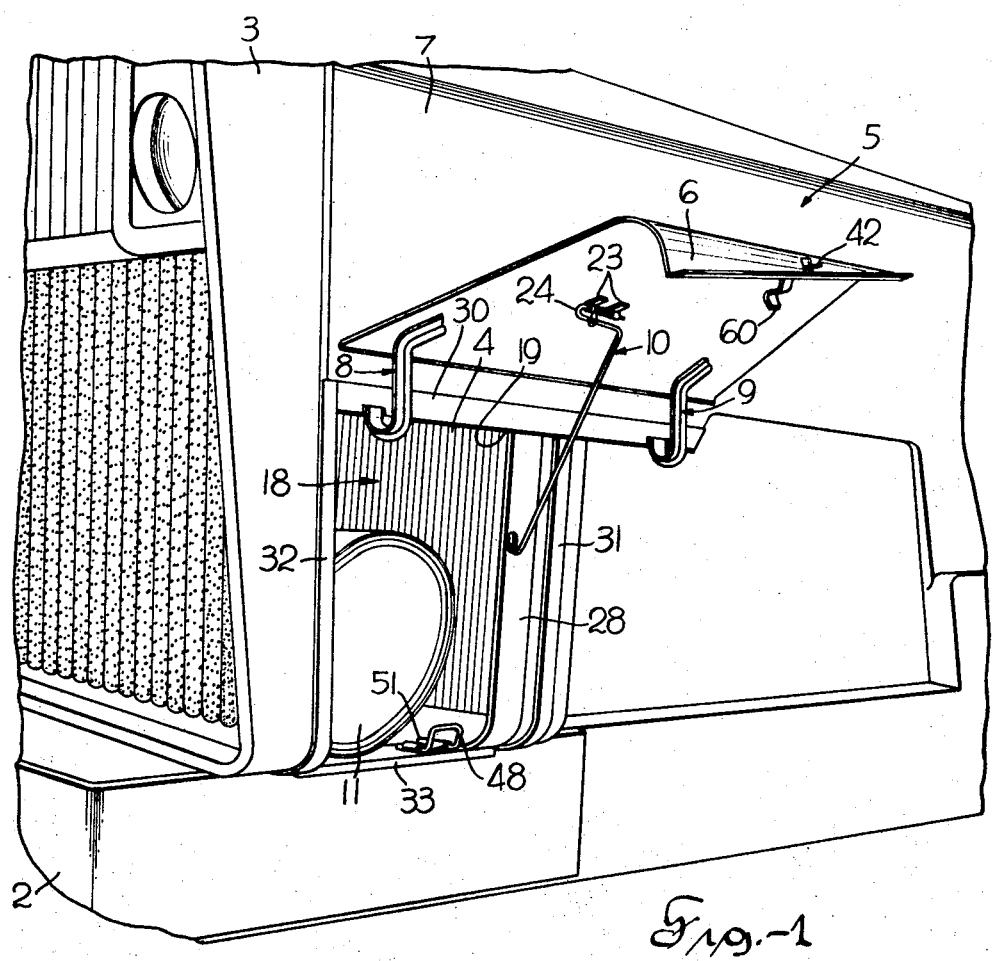
FIG. 1 illustrates a three dimensional view of the side panel pivoted upwardly in the open position permitting access to the compartment.

Referring to the drawings, the vehicle chassis includes the frame 1 carrying a front end weight hanger bracket 2. The frame 1 supports the grill 3 on the forward end of the chassis. The radiator 4 is also supported on the frame 1, as well as the cowl assembly which supports the rearward portion of the hood 5.

The engine hood 5 includes a side panel 6 pivotally supported on each side of the center section 7. The side panel 6 is carried on hinges 8 and 9 and is shown in FIG. 1 in the open position supported on the prop 10. The prop 10 automatically seats itself as the panel 6 is lifted to the position shown in FIG. 1.

The air cleaner 11 is carried on the bracket 12 which is supported on the frame 1 and has the conduit 13 extending upwardly and over the radiator to connect to the intake passages on the engine. The fan 15 is rotatably mounted forward of the engine 16 and positioned in the fan shroud 17 immediately behind the radiator 4. The fan draws air through the frill 3 and the compartment 18 and radiator 4. When the access opening 19 is closed, large airborne particles are prevented from coming into the compartment and the size of the particles passing through the radiator is determined by the size of openings in the grill 3.

A side panel is positioned on each side of the vehicle. For the purpose of illustration, only side panel 6 is shown and will be described. Side panel 6 is hingedly connected to the center section 7 of the hood 5. The bracket 20 carries the pin 21, which carries the hinge bracket 22. The hinge bracket 22 is fastened to the side panel 6. The hinge 8 described is similar in construction to that of hinge 9 which is mounted rearwardly on the side panel 6. Both hinges pivot on a coincidental axes for pivoting of the side panel when the panel is opened.

Side panel 6 also carries a prop support bracket 23 welded on its inner surface. The prop support bracket 23 pivotally supports the prop 10. The prop 10 comprises a U-shaped portion 24 supported in the bracket 23. A spring 25 biases the prop 10 downwardly against the lower edge 26 of the hold 27 in the metal strip 28.

FIG. 5 illustrates the side panel 6 pivoted upward wherein the spring 25 biases the prop 10 so that the hooked portion 29 in the lower end of the prop seats on the edge 26 of the opening 27. In this position the side panel is supported to permit access through the opening 19. When the side panel 6 is lowered, the prop 10 is pressed inwardly to release it from its seat on the edge 26 in the opening 27 thereby permitting the side panel to close the access opening 18.

The access opening is sealed by the upper horizontal seal 30 and the lateral seals 31 and 32, as well as the lower seal 33. As the side panel 6 is lowered, its inner surface engages all four of the seals sealing the opening to prevent the entrance of foreign material while the engine is in operation.

Referring to FIG. 4 the upper seal 30 and the lower seal 33 are shown engaging the inner surface of the side panel 6 in its lowered position whereby the access opening is sealed. The prop 10 is shown extending inwardly into the opening 27 when the side panel is closed.

The latch assembly comprises a U-shaped bracket 35 welded to the inner surface 36 of the side panel 6. The U-shaped bracket 35 carries the pin 37 which pivotally supports the latch member 38. The coil spring 39 engages the under surface 40 of the U-shaped bracket 35 and also engages the latch member 38 to bias it in a downward position so that the latch handle 42 substantially engages the edge 43 of the opening 44. In this position the arcuate section 45 of the latch arm 38 covers the opening 44. The handle 42 of latch member 38 prevents the latch member from further rotation in a clockwise direction.

As the side panel 6 is lowered, the cam surface 47 engages the pawl 48 which is bolted to the frame 1 by the bolt 49. The cam surface causes the latch member 38 to rotate in a counterclockwise direction sufficiently for the latch to ride under the pawl 48. The pawl 48 then seats in the recess 50 to firmly lock the side panel against the sealing element when the side panel is closed.

Figure 2:
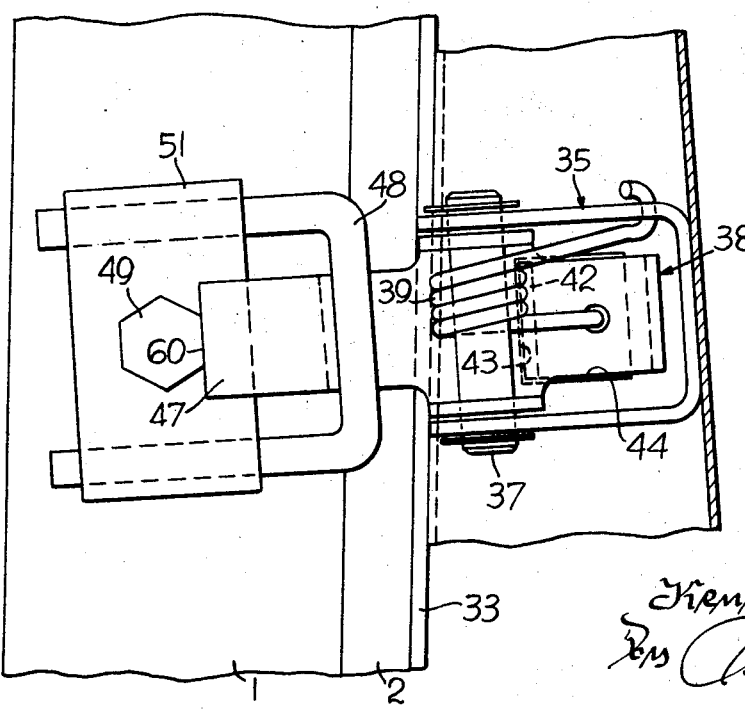
FIG. 2 is an enlarged fragmentary plan view showing the latch assembly.

FIG. 2 also illustrates the latch in a latched position. The spring 39 engages one side of the U-shaped bracket 35 while the other end of the spring 39 engages the center portion of the latched member 38. The retainer 51 together with the bolt 49 firmly lock the pawl 48 on the frame 1 of the vehicle.

The operation of the device will be described in the following paragraphs.

When the side panel 6 is in the latched position, it is firmly seated against the side of the vehicle. To unlatch the latch assembly, the handle portion 42 of the latch member 38 is moved in the counterclockwise direction against the biasing force of the spring 39. Jhis pivots the latch ends 60 away from the pawl 48 and releases the latch memger 38 from the pawl permitting the side panel 6 to pivot about the axis of pin 21. A continued force in the counterclockwise direction against the handle portion 42 of the latch member 38 causes the side panel to pivot outwardly and upwardly. A further upward movement will permit the spring 25 on the prop 10 to bias the prop downwardly causing the hooked portion 29 to seat on the edge 26. Accordingly, access to the compartment 18 is easy once the side panel is swung to the position as shown. The air filter 11 can be serviced from either side when both of the side panels are in the position as shown.

When servicing is complete, the door is then released by lifting the prop 10 allowing it to slide into the opening 27 and permitting the side panel 6 to move downwardly on its axis of movement of pin 21. As the side panel moves downwardly, it swings inwardly toward the vehicle. Initially the cam surface 47 engages the lower portion of the pawl 48. The swinging movement of the side panel 6 cuases the latch member 38 to spring downwardly and ride under the pawl 48. As the pawl 48 slides over the cam surface, it then drops into the recess 50 of the latch member 38 and firmly locks the side panel 6 against the side of the vehicle. It is noted that the seals 30, 31, 32 and 33 in this position firmly seat against the inner surfaces of the side panel The opening 19 is then sealed closed and any airborne foreign material is prevented from passing through the opening 19. The size of the impurities in the air permitted to pass to the air cleaner or in through the radiator is determined by the size of the perforations in the grill 3 on the forward portion of the vehicle.

Accordingly, it can be seen that the latch provides a convenient way of releasing the side panel 6 to a pivoted open position permitting access to the compartment 18. A prop 10 conveniently holds the side panel 6 in a position to permit access to the compartment 18. Upon completion of servicing the accessories in the compartment 18, the prop 10 is released and the side panel 6 is allowed to swing downwardly and automatically latch the panel closed and the vehicle is again ready for operation.

The embodiments of the ivnention in which an exclusive property or privilege is claimed are defined as follows:

1. A latch for a hood on an engine comprising, an engine hood including at least one side panel movably connected thereon, said side panel defining an opening, a hood supporting structure supporting said engine hood, a pawl member on said hood supporting structure, a latch means on said side panel including a latch member movably mounted on said panel and partially received in the opening of said side panel to enable manuipulation of the latch, means on said latch member forming a cover portion movably positioned over the opening when said panel is latched, resilient means biasing said latch member to engage said pawl member to thereby latch said side panel with said hood supporting structure.

2. A latch for a hood on an engine as set forth in claim 1 including means pivotally connecting the side panel with said hood supporting structure.

3. A latch for a hood on an engine as set forth in claim 1 including pivotal means pivotally connecting said latch member to said side panel, arcuate means defining an arcuate surface on said side panel having a radius of curvature substantially centered at the pivotal center of said latch member, said opening located on said arcuate surface, said latch member including an arcuate cover portion pivoting adjacent said opening of said side panel, and a handle integral with said cover portion and received in said opening thereby permitting said latch member to pivotally move adjacent the arcuate surface of said panel and thereby close said opening in said panel when said latch is latched.

4. A latch for a hood on an engine as set forth in claim 1 wherein said latch member includes, a latch end of said latch member, a cam surface on said latch end of said latch member for engaging said pawl to thereby bias said latch member to ride by said pawl when said side panel is swung to a closed position.

5. A latch for a hood on an engine as set forth in claim 1 wherein said latch member comprises means defining a recessed portion for receiving said pawl when said latch assembly is engaged.

6. A latch for a hood on an engine as set forth in claim 1 wherein said latch assembly includes a resilient latch member, a spring resiliently biasing said latch member to engage said pawl, said spring thereby shifting its relative position to permit riding under the pawl for engaging said latch.

7. A latch for a hood on an engine as set forth in claim 1 wherein said latch member includes a handle extending through said opening and said side panel, said cover portion riding along the inner periphery of said side panel for covering said opening when said latch member pivots to close said latch to thereby engage said latch and close said opening when said side panel is closed.

8. A latch for a hood on an engine as set forth in claim 1 including means defining an access opening in said supporting structure for said engine hood, sealing means extending on the external side and periphery of said access opening in said hood supporting structure, said sealing means thereby engaging the inboard surface of said side panel for sealing said access opening when said latch assembly is latched.

9. A lach for a hood on an engine as set forth in claim 1 wherein said hood supporting structure includes, a radiator extending upwardly to engage a central portion of said engine hood, a grill assembly extending upwardly to support the forward end of said engine hood, said hood, said radiator and said grill defining a compartment adapted for receiving an air cleaner, said side panel thereby operating as an access door to said compartment.

10. A latch for a hood on an engine as set forth in claim 1 wherein said supporting structure for said engine hood defines a compartment adapted for receiving an air cleaner, said hood supporting structure defines an access opening, said side panel thereby engaging said access opening and permitting access to service said compartment when said latch is unlatched and said panel is opened.

* * * * *